United States Patent
Shiokawa et al.

(10) Patent No.: US 11,504,897 B2
(45) Date of Patent: Nov. 22, 2022

(54) LIQUID CONTAINER MANUFACTURING METHOD

(71) Applicant: YOSHINO KOGYOSHO CO., LTD., Tokyo (JP)

(72) Inventors: Mitsuru Shiokawa, Tokyo (JP); Hideaki Hoshino, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 104 days.

(21) Appl. No.: 16/604,542

(22) PCT Filed: Jan. 23, 2018

(86) PCT No.: PCT/JP2018/001931
§ 371 (c)(1),
(2) Date: Oct. 10, 2019

(87) PCT Pub. No.: WO2018/198448
PCT Pub. Date: Nov. 1, 2018

(65) Prior Publication Data
US 2020/0130249 A1    Apr. 30, 2020

(30) Foreign Application Priority Data
Apr. 27, 2017 (JP) .............................. JP2017-088888

(51) Int. Cl.
*B29C 49/46* (2006.01)
*B29C 49/12* (2006.01)
*B29L 31/00* (2006.01)

(52) U.S. Cl.
CPC ............. *B29C 49/46* (2013.01); *B29C 49/12* (2013.01); *B29C 2049/4652* (2013.01); *B29L 2031/7158* (2013.01)

(58) Field of Classification Search
CPC . B29C 49/46; B29C 49/12; B29C 2049/4652; B29C 49/28; B29L 2031/7158; B29L 2022/00; B29D 22/00; B29D 22/003
See application file for complete search history.

(56) References Cited

U.S. PATENT DOCUMENTS

| | | | |
|---|---|---|---|
| 9,259,887 B2 | 2/2016 | Fevre et al. | |
| 2014/0367895 A1* | 12/2014 | Sato | B29C 49/46 264/532 |
| 2015/0246475 A1* | 9/2015 | Suyama | B29C 49/58 264/526 |

FOREIGN PATENT DOCUMENTS

| | | |
|---|---|---|
| CN | 104136195 A | 11/2014 |
| EP | 2 987 612 A1 | 2/2016 |

(Continued)

OTHER PUBLICATIONS

Feb. 27, 2018 International Search Report issued in International Patent Application No. PCT/JP2018/001931.

(Continued)

*Primary Examiner* — Jeffrey M Wollschlager
*Assistant Examiner* — Shibin Liang
(74) *Attorney, Agent, or Firm* — Oliff PLC (57) ABSTRACT

A liquid container manufacturing method includes: a nozzle fitting step of fitting a blow nozzle to a mouth of a preform; a liquid blow molding step of liquid blow molding the preform into a halfway shape by supplying a predetermined volume of liquid that is less than a full capacity of a liquid container from a liquid supply port of the blow nozzle to the preform; and an air blow molding step of molding the preform into a shape conforming to an inner surface of a mold for blow molding by supplying pressurized air from a gas supply port to the preform after the liquid supply port is closed, in which a headspace is generated in the liquid container, having a volume corresponding to a difference (Continued)

between a volume of the liquid supplied to the preform in the liquid blow molding step and a full capacity of the liquid container.

5 Claims, 7 Drawing Sheets

(56) References Cited

FOREIGN PATENT DOCUMENTS

| | | |
|---|---|---|
| JP | 2009-533290 A | 9/2009 |
| JP | 2013-154603 A | 8/2013 |
| JP | 2014-069441 A | 4/2014 |

OTHER PUBLICATIONS

Oct. 29, 2019 International Preliminary Report on Patentability issued in International Patent Application No. PCT/JP2018/001931.
Dec. 10, 2020 Extended Search Report issued in European Patent Application No. 18790513.8.
Sep. 15, 2021 Office Action issued in Chinese Patent Application No. 201880025297.3.
Jun. 23, 2020 Office Action issued in Japanese Patent Application No. 2017-088888.
Feb. 2, 2021 Office Action issued in Chinese Patent Application No. 201880025297.3.

* cited by examiner

LIQUID CONTAINER MANUFACTURING METHOD

TECHNICAL FIELD

The present disclosure relates to a liquid container manufacturing method of manufacturing a liquid container containing a content liquid from a synthetic resin preform.

BACKGROUND

Synthetic resin containers, representatives of which are polypropylene (PP) bottles and polyethylene terephthalate (PET) bottles, are used in applications in which a variety of liquids such as beverages and toiletries including cosmetics, chemicals, detergents, shampoos or the like are contained as a content liquid. Such containers are generally manufactured by blow molding a preform formed by a thermoplastic synthetic resin material described above.

As the blow molding in which a preform is molded into a container, the liquid blow molding is known, in which, as a pressurized medium supplied into a preform, a pressurized liquid is used instead of pressurized air.

For example, Patent Literature 1 (PTL 1) discloses a liquid blow molding method in which a synthetic resin preform heated in advance to a temperature at which stretchability is achieved is placed into a mold for blow molding and a liquid pressurized to a predetermined pressure by a pump is supplied into the preform through a blow nozzle. In this manner a preform is molded into a container of a predetermined shape conforming to a cavity of the mold for blow molding.

In the above described liquid blow molding method, as a liquid supplied into a preform, a content liquid such as beverage contained finally in a container as a product is used, and molding of a container and filling of a content liquid are performed at the same time. In this manner a liquid container containing a content liquid can be manufactured. Therefore, according to the liquid container manufacturing method using the liquid blow molding described above, a step of filling a content liquid into a container after molding is omitted, and a liquid container can be manufactured at a low cost.

CITATION LIST

Patent Literature

PTL 1: JP2014069441A

SUMMARY

Technical Problem

In general, a predetermined volume of headspace (a space not filled with a liquid) is provided in a liquid container. In the above described existing liquid container manufacturing method, after the liquid blow molding, a pump is driven in a reverse direction and a suck-back step of sucking back a predetermined volume of liquid from a container after molding toward a supply channel is performed to provide a predetermined volume of headspace in a liquid container.

However, in the liquid blow molding, since a liquid as a pressurized medium is supplied into a preform while catching the air present in the preform, after the liquid blow molding, a liquid filled in a container contains a lot of bubbles, and when a suck-back step is performed after the liquid blow molding, a liquid containing a lot of bubbles is taken into the supply channel. Thus, in the next liquid blow molding, a liquid containing a lot of bubbles is supplied from the supply channel into the preform, which may cause a problem of lack of volume of a liquid filled into a liquid container or of a decline in moldability of a container by an unstable filling pressure during the liquid blow molding.

In order to address the above described problem, a liquid containing bubbles may be discharged from the supply channel to outside before the next liquid blow molding is performed. However, in this case, a useless liquid or step may be caused.

The present disclosure has been conceived in view of the above described problem, and is to provide a liquid container manufacturing method in which a liquid container having a predetermined content volume and a shape can be manufactured precisely at a low cost.

Solution to Problem

A disclosed liquid container manufacturing method is a liquid container manufacturing method in which a liquid container containing a content liquid is manufactured from a synthetic resin preform, the method including: a nozzle fitting step of fitting a blow nozzle to a mouth of the preform placed in a mold for blow molding; a liquid blow molding step of liquid blow molding the preform into a halfway shape by supplying a predetermined volume of liquid in a pressurized state from a liquid supply port provided to the blow nozzle into the preform, the predetermined volume being less than a full capacity of the liquid container; and an air blow molding step of molding the preform of a halfway shape into a shape conforming to an inner surface of the mold for blow molding by supplying pressurized air from a gas supply port provided separately from the liquid supply port into the preform after the liquid supply port is closed, in which a headspace having a volume corresponding to a difference between a liquid volume supplied to the preform in the liquid blow molding step and a full capacity of the liquid container is generated in the liquid container after molding.

The disclosed liquid container manufacturing method configured in the above described manner may preferably further include, after the air blow molding step, a release to atmosphere step of releasing the inside of the liquid container to atmosphere through the gas supply port.

The disclosed liquid container manufacturing method configured in the above described manner may preferably include: a rod stretching step of axially stretching the preform by a stretching rod before or during the liquid blow molding step; and a rod pulling step of separating the stretching rod from the liquid container after the air blow molding step.

Advantageous Effect

According to the present disclosure, a liquid container manufacturing method in which a liquid container having a predetermined content volume and a shape can be manufactured precisely at a low cost can be provided.

DETAILED DESCRIPTION

The present disclosure will be described in more detail below with reference to the drawings.

A liquid container manufacturing method according to an embodiment of the present disclosure is a liquid container manufacturing method in which a liquid container containing a content liquid is manufactured from a synthetic resin preform, the method including: a nozzle fitting step of fitting a blow nozzle to a mouth of the preform placed in a mold for blow molding; a liquid blow molding step of liquid blow molding the preform into a halfway shape by supplying a predetermined volume of liquid in a pressurized state from a liquid supply port provided to the blow nozzle into the preform, the predetermined volume being less than a full capacity of the liquid container; and an air blow molding step of molding the preform of a halfway shape into a shape conforming to an inner surface of the mold for blow molding by supplying pressurized air from a gas supply port provided separately from the liquid supply port into the preform after the liquid supply port is closed, in which a headspace having a volume corresponding to a difference between a liquid volume supplied to the preform in the liquid blow molding step and a full capacity of the liquid container is generated in the liquid container after molding.

The liquid container manufacturing method according to the present embodiment includes a release to atmosphere step of releasing an inside of the liquid container to atmosphere through a gas supply port after the air blow molding step.

The liquid container manufacturing method according to the present embodiment also includes: before the liquid blow molding step, a rod stretching step of axially stretching the preform by a stretching rod; and, after the air blow molding step, a rod pulling step of separating the stretching rod from the liquid container.

Figure 1:
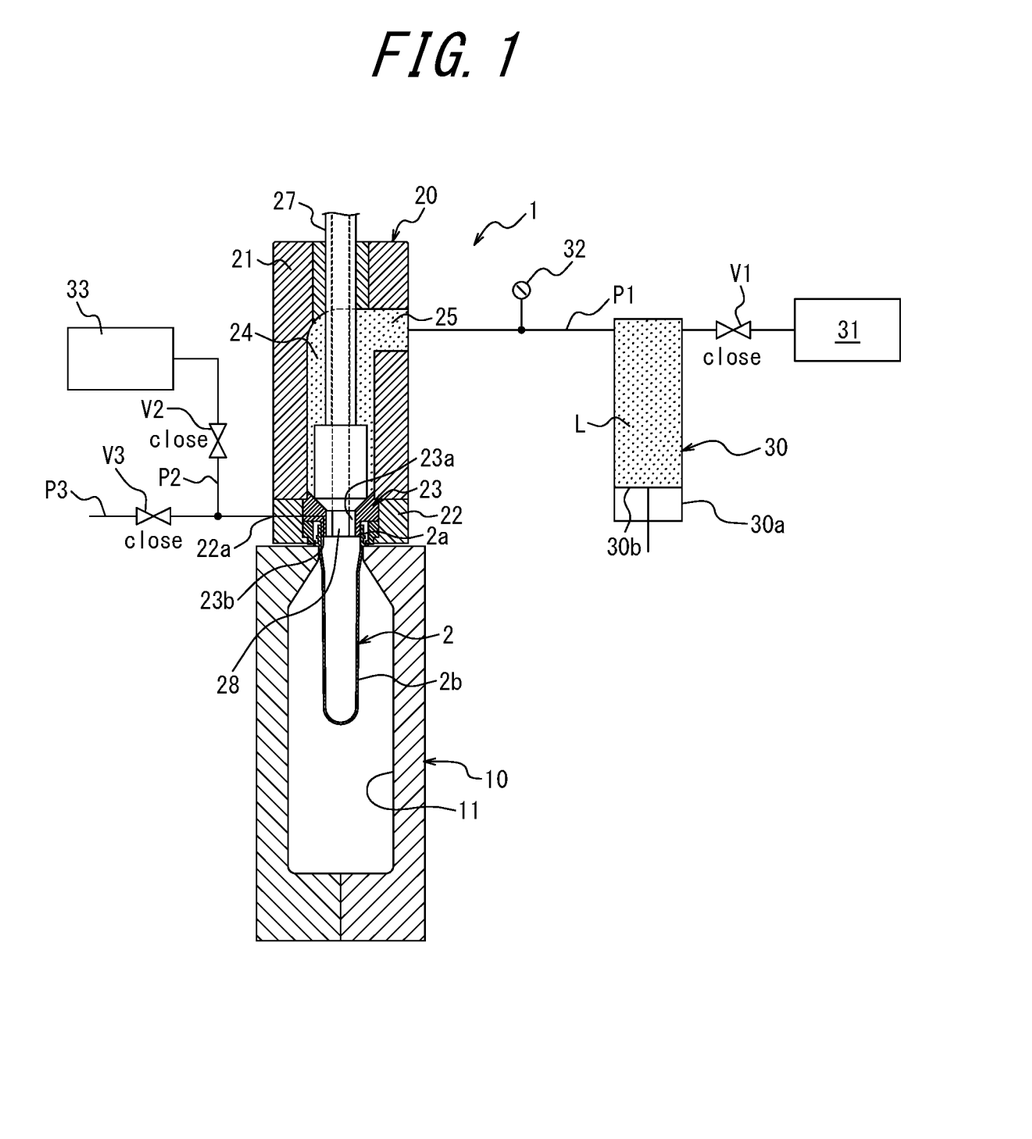
FIG. 1 illustrates an example of a liquid container manufacturing apparatus used for a liquid blow molding method according to an embodiment of the present disclosure.

The above described disclosed liquid container manufacturing method can be performed by using a liquid container manufacturing apparatus 1 configured as illustrated in FIG. 1.

The liquid container manufacturing apparatus 1 illustrated in FIG. 1 is used to manufacture a liquid container C containing a content liquid from a synthetic resin preform 2. As the liquid (content liquid) L contained in a liquid container C, a variety of liquids L such as, for example, beverages and toiletries including cosmetic products, pharmaceutical products, detergents and shampoo can be adopted.

As the preform 2, those formed, by a thermoplastic synthetic resin material such as polypropylene (PP) and polyethylene terephthalate (PET), for example, into a bottomed tubular shape including a cylindrical mouth 2a, which is an open end, and a cylindrical barrel 2b continuing to the mouth 2a and having a closed lower end can be used.

Although not illustrated in detail, on the outer wall surface of the mouth 2a is provided with a fitting protrusion configured to mount a closing cap (not illustrated) to the mouth 2a of the liquid container C after molding by plugging (undercut fitting). It is to be noted that, instead of the fitting protrusion, a male thread may be provided to the outer wall surface of the mouth 2a so as to mount the closing cap to the mouth 2a through thread connection.

The liquid container manufacturing apparatus 1 has a mold for blow molding 10. The mold for blow molding 10 has a cavity 11 of a shape corresponding to a final shape of the liquid container C such as a bottle shape, for example. The cavity 11 opens upward on the upper surface of the mold for blow molding 10. The preform 2 is placed in the mold for blow molding 10 with the barrel 2b disposed in the cavity 11 of the mold for blow molding 10 and with the mouth 2a protruded upward from the mold for blow molding 10.

The mold for blow molding 10 can be opened right and left. After the preform 2 is molded into a liquid container C, the liquid container C can be ejected from the mold for blow molding 10 by opening the mold for blow molding 10 right and left.

Above the mold for blow molding 10 is provided with a nozzle unit 20 configured to supply a pressurized liquid L into the preform 2. The nozzle unit 20 has a main body block 21, and the main body block 21 is vertically movable relative to the mold for blow molding 10.

Figure 2:
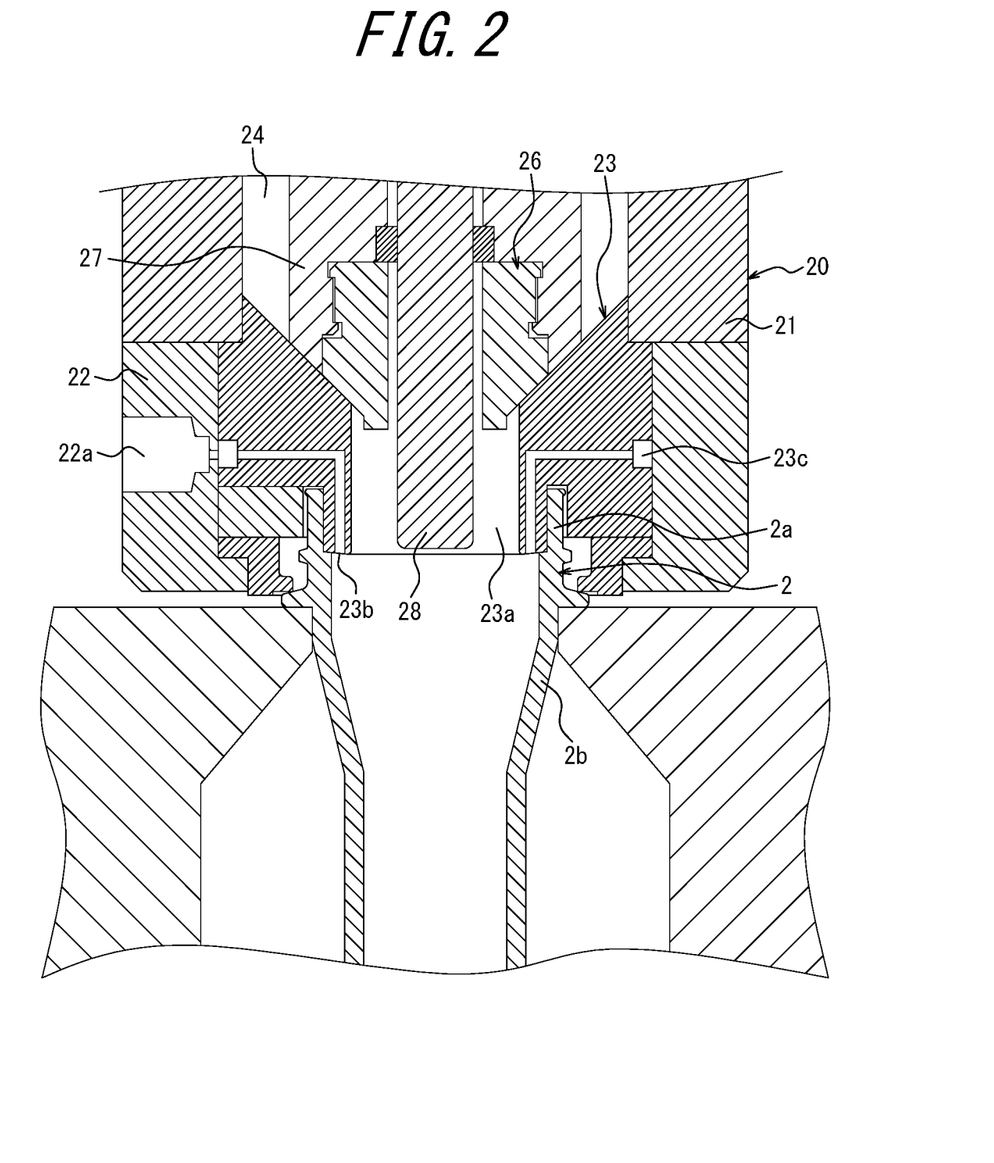
FIG. 2 is a cross-sectional view illustrating a detailed configuration of a main part of a nozzle unit in FIG. 1.

As illustrated in FIG. 2, the lower end of the main body block 21 is provided with a support block 22, and a blow nozzle 23 is mounted to the lower end of the main body block 21 by being supported by the support block 22. The blow nozzle 23 is formed into a substantially cylindrical shape, and when the main body block 21 is lowered to the stroke end on the lower side, fits in a sealed manner from above into the mouth 2a of the preform 2 placed in the mold for blow molding 10.

The inside of the cylindrical portion of the blow nozzle 23 is configured as a liquid supply port 23a. Further, the cylindrical portion constituting the liquid supply port 23a of the blow nozzle 23 is provided with a gas supply port 23b that opens to the lower end of the cylindrical portion. In the present embodiment, the cylindrical portion of the blow nozzle 23 is provided with eight gas supply ports 23b that are circumferentially arranged side by side at regular intervals. The number thereof may be changed in a variety of manners.

Inside the main body block 21 is provided with a supply channel 24 that extends in the vertical direction. The supply channel 24 is a flow channel configured to supply liquid L to the liquid supply port 23a of the blow nozzle 23, and communicates with the liquid supply port 23a of the blow nozzle 23 at the lower end thereof.

Furthermore, as illustrated in FIG. 1, the main body block 21 is provided with a supply port 25 that communicates with the upper end of the supply channel 24.

Inside the supply channel 24 is provided with a seal body 26 configured to open/close the liquid supply port 23a of the blow nozzle 23. The seal body 26 is fitted to the lower end of a shaft body 27 provided vertically movable relative to the nozzle unit 20, and is vertically movable in the supply channel 24. The seal body 26 may be formed integrally with the shaft body 27. The seal body 26 is formed into a columnar shape, and comes in contact with the upper surface of the blow nozzle 23 on the lower end surface when it moves to the close position, which is a stroke end position on the lower side, and closes the liquid supply port 23a of the blow nozzle 23. On the other hand, when the seal body 26 moves upward from the close position, the liquid supply port 23a of the blow nozzle 23 is opened and communicated with the supply channel 24.

As illustrated, the liquid container manufacturing apparatus 1 may include a stretching rod 28. The stretching rod 28 is inserted into a shaft center of the shaft body 27 so that it is vertically movable relative to the shaft body 27, and is provided so as to be extendable and retractable from the lower end of the seal body 26 through the shaft center of the seal body 26. The stretching rod 28 is driven by a driving source not illustrated and moves downward, thus can axially stretch the preform 2.

A pressurized liquid supply source 30 is connected to the supply port 25 through a pipe P1. The pressurized liquid supply source 30 can be configured as a plunger pump that includes a cylinder 30a and a piston (plunger) 30b.

A supply tank 31 is connected to the pressurized liquid supply source 30. The supply tank 31 may be configured to store the liquid L, heat the liquid L up to a predetermined temperature and hold the liquid at the temperature. A flow channel between the pressurized liquid supply source 30 and the supply tank 31 is provided with an opening-closing valve V1, and the flow channel can be opened/closed by the opening-closing valve V1. It is to be noted that the reference sign 32 represents a pressure gauge provided to the pipe P1.

A plurality of gas supply ports 23b provided to the blow nozzle 23 are communicated with a connection channel 23c annularly provided on the outer periphery of the blow nozzle 23 through flow channels, each extending upward and bending radially outward. The connection channel 23c is connected to the pressurized air supply source 33 through a pipe P2 connected to a connection port 22a provided on the side of the support block 22. That is, each of a plurality of gas supply ports 23b provided to the blow nozzle 23 is connected to a pressurized air supply source 33. The pressurized air supply source 33 can be configured as an air compressor, for example. An opening-closing valve V2 is provided to the pipe P2.

A pipe P3 released to the atmosphere is branch-connected to the pipe P2 on the side closer to the gas supply port 23b than the opening-closing valve V2. An opening-closing valve V3 is provided to the pipe P3.

The pressurized liquid supply source 30 operates in a positive direction (a pressurized direction) with the seal body 26 moved upward to open the liquid supply port 23a and with the opening-closing valves V1 to V3 closed. In this manner, the pressurized liquid supply source 30 can supply liquid L pressurized up to a predetermined pressure into the preform 2 through the pipe P1, the supply port 25, the supply channel 24 and the liquid supply port 23a of the blow nozzle 23. Further, the pressurized liquid supply source 30 operates in a reverse direction (a sucking direction) with the liquid supply port 23a closed by the seal body 26 and the opening-closing valve V1 open. In this manner, the pressurized liquid supply source 30 can suck the liquid L stored in the supply tank 31 into the cylinder 30a to prepare for the next liquid blow molding.

The pressurized air supply source 33 operates with the liquid supply port 23a closed by the seal body 26, the opening-closing valve V3 closed and the opening-closing valve V2 open. In this manner the pressurized air supply source 33 can supply pressurized air at a predetermined pressure into the preform 2 through the pipe P2 and the gas supply port 23b.

Further, the pipe P3 can release the inside of the preform 2 or the liquid container C after molding to the atmosphere through the gas supply port 23b with the opening-closing valve V3 open in a state where the liquid supply port 23a is closed by the seal body 26 and where the opening-closing valve V2 is closed.

Operation of the nozzle unit 20, the seal body 26, the stretching rod 28, the pressurized liquid supply source 30, the pressurized air supply source 33 and the opening-closing valves V1 to V3 are controlled by a controller (not illustrated) in an integrated manner. This control can be performed with reference to the values and the like of the pressure gauge 32. It is preferable that the opening-closing valves V1 to V3 are configured as solenoid valves that can be controlled by the controller.

Next, a method of molding, from a synthetic resin preform 2, a liquid container C containing a liquid (content liquid) L in a container of a predetermined shape by using the liquid container manufacturing apparatus 1 configured in the above described manner (a liquid container manufacturing method according to the present embodiment) will be described.

First, a preform 2 is placed in the mold for blow molding 10 and is clamped, the preform 2 being preheated to a predetermined temperature (e.g. from 80° C. to 150° C.) at which stretchability is achieved by using a heating means (not illustrated) such as a heater.

Next the nozzle fitting step is performed. In the nozzle fitting step, the nozzle unit 20 is lowered toward the mold for blow molding 10 to allow the blow nozzle 23 to be fitted with the mouth 2a of the preform 2 in a sealed manner. FIGS. 1 and 2 illustrate a state in which the blow nozzle 23 fits into the mouth 2a of the preform 2. In this state, the seal body 26 and the opening-closing valves V1 to V3 are all closed. Further, the stretching rod 28 is held at its original position where it does not protrude downward from the blow nozzle 23.

Figure 3:
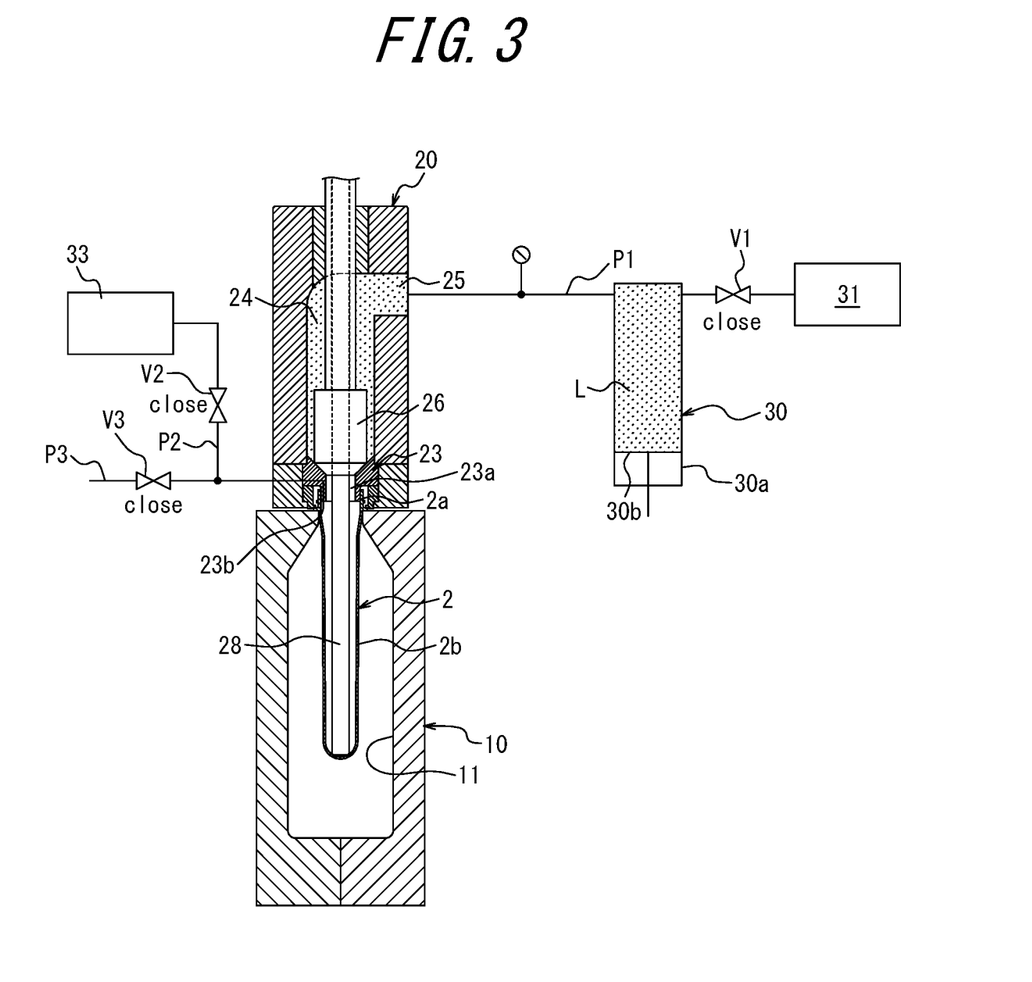
FIG. 3 is a diagram illustrating the liquid container manufacturing apparatus during a rod stretching step.

Next, as illustrated in FIG. 3, the rod stretching step is performed. In the rod stretching step, the stretching rod 28 is moved downward with the seal body 26 and the opening-closing valves V1 to V3 closed, and the barrel 2b of the preform 2 is stretched by the stretching rod 28 in the axial (longitudinal) direction.

Figure 4:
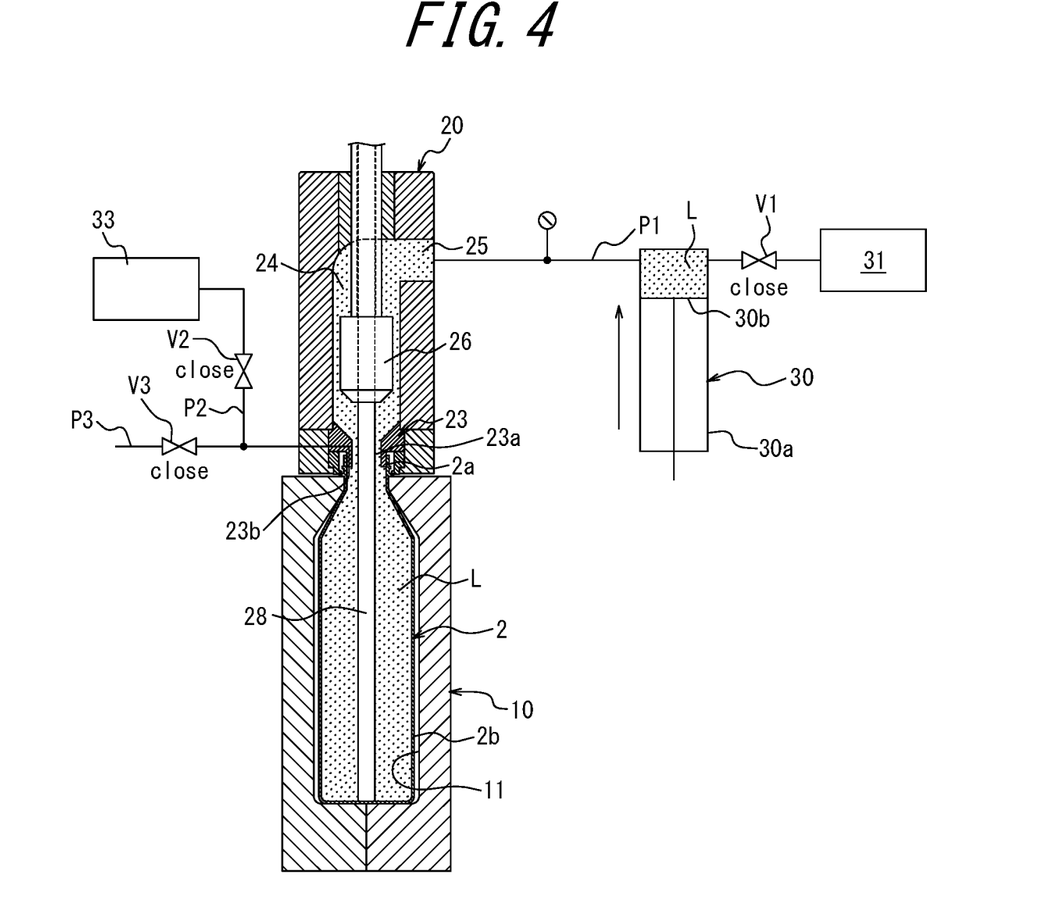
FIG. 4 is a diagram illustrating the liquid container manufacturing apparatus during a liquid blow molding step.

Next, as illustrated in FIG. 4, the liquid blow molding step is performed. In the liquid blow molding step, the seal body 26 is moved upward with the opening-closing valves V1 to V3 closed to open the liquid supply port 23a, and in that state the pressurized liquid supply source 30 is operated in the positive (pressurized) direction. In this manner, liquid L pressurized to a predetermined pressure is supplied from the pressurized liquid supply source 30 into the preform 2 through the pipe P1, the supply port 25, the supply channel 24 and the liquid supply port 23a of the blow nozzle 23, and the preform 2 is liquid blow molded by a pressure of the liquid L.

In this context, in the liquid blow molding step, only a predetermined volume of liquid L which is less than the full capacity (a maximum volume of liquid contained in a container) of a liquid container C, which is a finished product, is supplied from the liquid supply port 23a to the preform 2. Therefore, in the liquid blow molding step, the preform 2 is not molded into a predetermined shape conforming to an inner surface of a cavity 11 of the mold for blow molding 10, but molded into a halfway shape which is smaller than the predetermined shape.

Figure 5:
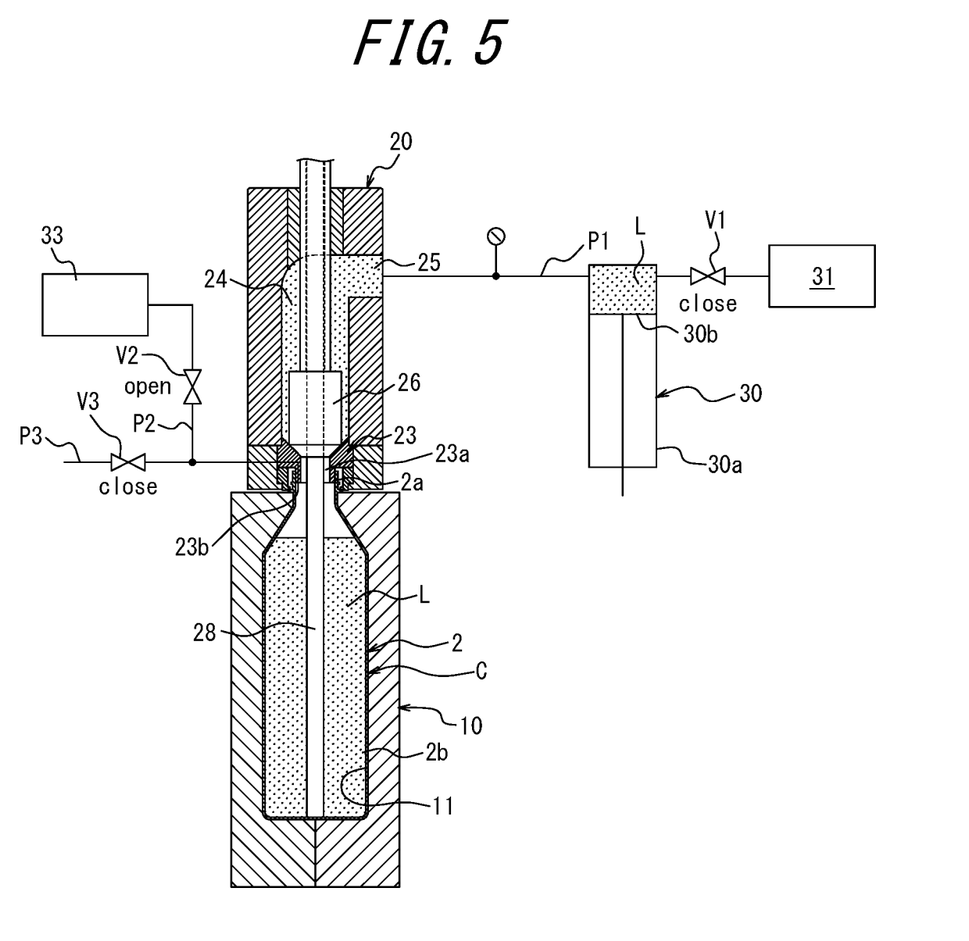
FIG. 5 is a diagram illustrating the liquid container manufacturing apparatus during an air blow molding step.

After the liquid blow molding step is finished, the air blow molding step is performed after the liquid supply port 23a is closed by the seal body 26, as illustrated in FIG. 5. In the air blow molding step, the pressurized air supply source 33 is operated with the seal body 26 and the opening-closing valves V1 and V3 closed and the opening-closing valve V2 open. In this manner, pressurized air of a predetermined pressure is supplied from the pressurized air supply source 33 into the preform 2 through the pipe P2 and the gas supply port 23b to air blow mold the preform 2 by a pressure of the pressurized air.

In this context, in the air blow molding step, the preform 2 molded into the halfway shape in the liquid blow molding step is molded into a predetermined shape conforming to an inner surface of the cavity 11 of the mold for blow molding 10 by a pressure of the pressurized air supplied from the gas supply port 23b. That is, in the liquid container manufacturing method according to the present embodiment, a two-step blow molding, which is the liquid blow molding step and the air blow molding step, is performed, and the preform 2 is molded into a liquid container C of a predetermined shape.

In this manner, in the liquid container manufacturing method according to the present embodiment, only a predetermined volume of liquid L that is less than the full capacity of the liquid container C, which is a finished product, is supplied in the liquid blow molding step, and after that the air blow molding is performed to mold the preform 2 into a predetermined shape. As a result, while the preform 2 is reliably molded into a predetermined shape, only a liquid L that is less than the full capacity of the liquid container C can be contained in a liquid container C after molding. In this manner, without performing another step such as a suck-back step, a headspace HS having a volume corresponding to a difference between the liquid L supplied to the preform 2 in the liquid blow molding step and the full capacity of the liquid container C can be easily and reliably generated in the liquid container C after molding.

Figure 6:
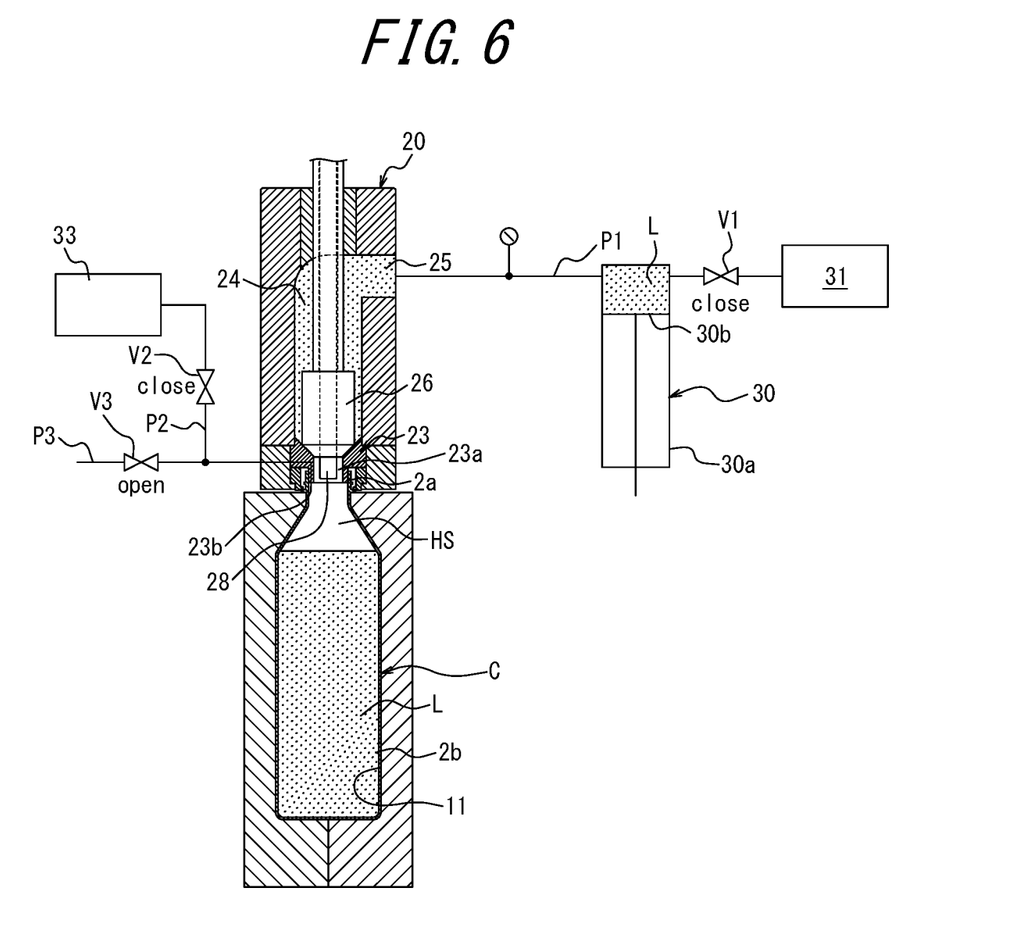
FIG. 6 is a diagram illustrating the liquid container manufacturing apparatus during a release to atmosphere step after a rod pulling step.

When the air blow molding step is finished, the rod pulling step in which the stretching rod 28 is moved upward to separate it from the liquid container C is performed as illustrated in FIG. 6, and after that the release to atmosphere step is performed. In the release to atmosphere step, the opening-closing valve V3 is opened with the seal body 26 and the opening-closing valves V1 and V2 closed, and the inside of the liquid container C is released to the atmosphere through the gas supply port 23b and the pipe P3. In this manner, the pressure inside the liquid container C can be atmospheric pressure. The release to atmosphere step may be performed not only after the rod pulling step but also before the rod pulling step, or may be performed during the rod pulling step.

It is to be noted that, in the rod pulling step, when the stretching rod 28 is pulled out from the liquid container C and separated therefrom, a headspace HS in the liquid container C is increased by the capacity of the stretching rod 28 that has been pulled out. Therefore, when the rod stretching step and the rod pulling step are performed, a volume of the liquid L to be supplied to the preform 2 in the liquid blow molding step is set in consideration of the volume of the headspace HS formed through pulling out of the stretching rod 28. In this manner a desired volume of headspace HS can be generated in a finished liquid container C.

Figure 7:
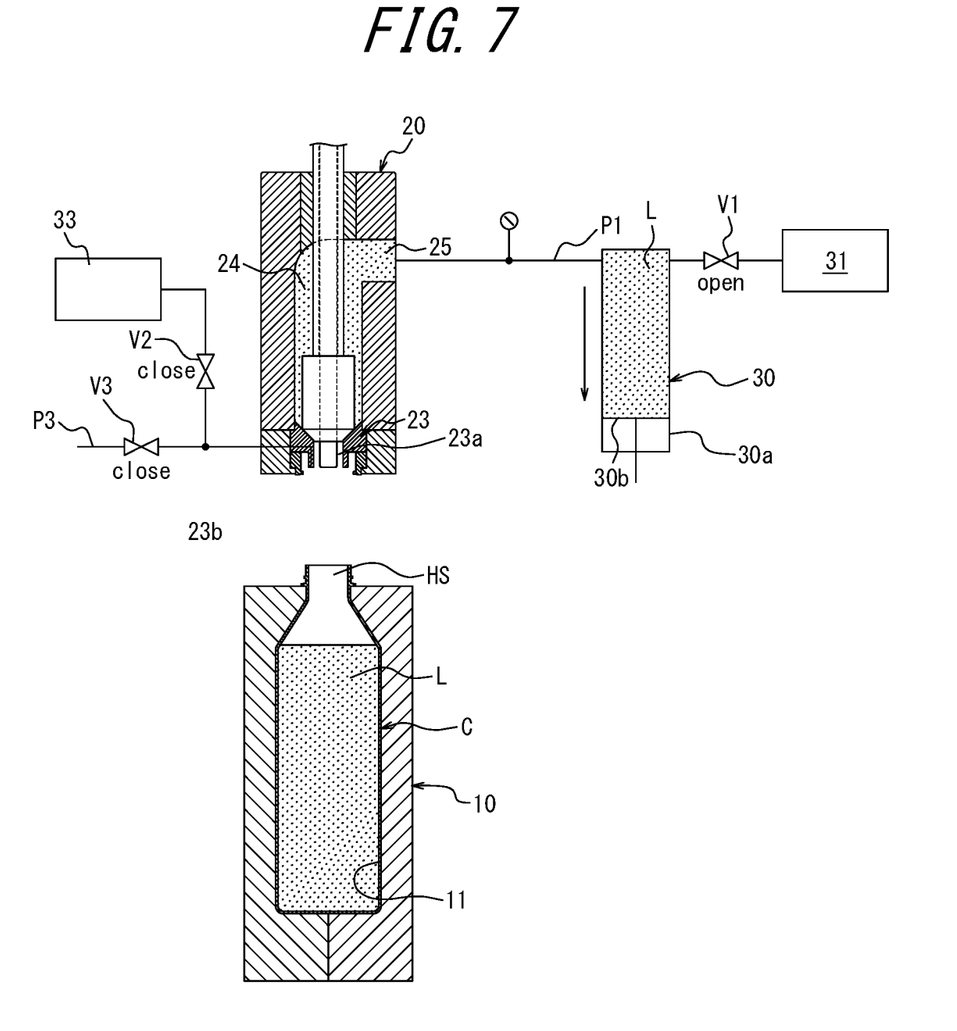
FIG. 7 is a diagram illustrating the liquid container manufacturing apparatus after manufacturing of a liquid container is finished.

As illustrated in FIG. 7, the nozzle unit 20 is moved upward relative to the mold for blow molding 10, and manufacturing of a liquid container C is finished. In this case, when the above described release to atmosphere step is performed in advance, the liquid L contained in the liquid container C is prevented from flowing out.

Further, when manufacture of a liquid container C is finished, the mold for blow molding 10 is opened to eject the liquid container C from the mold for blow molding 10. After that a closing cap is attached to the mouth 2a and the container C is provided as a product. Further, the pressurized liquid supply source 30 is operated in the reverse direction, and the liquid L stored in the supply tank 31 is sucked into a cylinder 30a. It is also possible that, after the closing cap is attached to the mouth 2a, the mold for blow molding 10 is opened to eject the liquid container C from the mold for blow molding 10.

As described above, in the liquid container manufacturing method according to the present embodiment, only a predetermined volume of liquid L that is less than the full capacity of a liquid container C, which is a finished product, is supplied in the liquid blow molding step, and thereafter the air blow molding is performed so that a headspace HS having a volume corresponding to a difference between the liquid L supplied to the preform 2 in the liquid blow molding step and the full capacity of the liquid container C is generated in the liquid container C after molding. In this manner, a desired headspace HS can be provided in the liquid container C without performing the other steps such as a suck-back step and the like in which the liquid L is sucked back from the liquid container C after molding. Therefore, without causing a problem such as a lack of volume of the liquid L filled into the liquid container C due to a liquid L containing a lot of air bubbles taken into the supply channel 24 or a decline in the moldability of a container due to an unstable container moldability during the liquid blow molding, as in the case where the suck-back step is performed, or without causing a useless liquid L containing bubbles to be discharged from the supply channel 24 or a step therefor, a liquid container C having a predetermined content volume and a shape can be precisely manufactured at a low cost.

Further, in the liquid container manufacturing method according to the present embodiment, the volume of the liquid L to be supplied to the preform 2 is adjusted in the liquid blow molding step. In this manner, a volume of the headspace HS provided in a liquid container C after molding can be easily changed. Therefore, even in the case where a large headspace HS is needed as in the case of a liquid container C used for a container with a pump that contains shampoo and the like as a content liquid, for example, a large headspace HS can be generated easily and precisely in the liquid container C without deforming the liquid container C after molding to undergo volume reduction as in the case where the suck-back step is performed.

Moreover, when the rod stretching step is included, a biaxial stretch blow molding in which a liquid blow molding is performed while a preform 2 is axially stretched by a stretching rod 28 can be performed. In this manner a preform 2 can be molded into a liquid container C of a predetermined shape more precisely.

The present disclosure is not limited to the above described embodiment, and it is needless to say that various modifications may be made without departing from the spirit of the present disclosure.

For example, in the above described embodiment, although a liquid container manufacturing apparatus 1 configured as illustrated in FIG. 1 is used to perform the disclosed liquid container manufacturing method, a liquid container manufacturing apparatus of the other configuration may be used to perform the disclosed liquid container manufacturing method.

Further, in the above described embodiment, although the rod stretching step and the rod pulling step are performed by using a liquid container manufacturing apparatus 1 provided with a stretching rod 28, these steps may not be performed. In that case, a liquid container manufacturing apparatus 1 provided with no stretching rod 28 may be used.

Moreover, in the above described embodiment, although the pressurized liquid supply source 30 is configured as a plunger pump, it is not limited thereto, and a variety of types of pumps may be used as far as a liquid L can be pressurized to a predetermined pressure before it is supplied to a preform 2.

Furthermore, in the above described embodiment, although the pressurized air supply source 33 is configured as an air compressor, it is not limited thereto, and those having a variety of configurations may be used as far as it can supply air pressurized to a predetermined pressure to a preform 2.

Moreover, a preform 2 of a variety of shapes may be used depending on the shape or the like of a liquid container C after molding.

Furthermore, in the above described embodiment, although the rod stretching step is performed before the liquid blow molding step, it may be performed during or after the liquid blow molding step, or during the air blow step. Further, it is also possible that, in the liquid blow molding step, the stretching rod 28 is moved forward to a halfway position to stretch the preform 2 to a halfway length, and in the following air blow molding step, the stretching rod 28 is moved further to stretch the preform 2 to the bottom of the mold for blow molding 10.

Moreover, in the above described embodiment, although the gas supply port 23b is provided to the blow nozzle 23, it is not limited thereto, and the gas supply port 23b may be provided to the other portions such as the stretching rod 28 or the like as far as it can supply pressurized air into the preform 2.

Furthermore, in the above described embodiment, although the rod pulling step is performed after the air blow molding step, it is not limited thereto, and the rod pulling step may be performed during or before the air blow molding step.

REFERENCE SIGNS LIST 1 liquid container manufacturing apparatus
2 preform
2a mouth
2b barrel
10 mold for blow molding
11 cavity
20 nozzle unit
21 main body block
22 support block
22a connection port
23 blow nozzle
23a liquid supply port
23b gas supply port
23c connection channel
24 supply channel
25 supply port
26 seal body
27 shaft body
28 stretching rod
30 pressurized liquid supply source
30a cylinder
30b piston
31 supply tank
32 pressure gauge
33 pressurized air supply source
L liquid
P1 pipe
V1 opening-closing valve
P2 pipe
V2 opening-closing valve
P3 pipe
V3 opening-closing valve
C liquid container

The invention claimed is:

1. A liquid container manufacturing method of manufacturing a liquid container containing a content liquid from a synthetic resin preform, the method comprising:
   a nozzle fitting step of fitting a blow nozzle to a mouth of the preform placed in a mold for blow molding;
   a liquid blow molding step of liquid blow molding the preform into a halfway shape by supplying a predetermined volume of liquid in a pressurized state from a liquid supply port provided to the blow nozzle into the preform, the predetermined volume being less than a full capacity of the liquid container and the halfway shape comprising the preform in a shape not fully conforming to an inner surface of the mold;
   stopping the supply of the liquid into the preform in the liquid blow molding step once the halfway shape is achieved and before the preform reaches a full shape conforming to the inner surface of the mold; and
   after the stopping the supply of the liquid into the preform in the liquid blow molding step, an air blow molding step of molding the preform of the halfway shape into the full shape conforming to the inner surface of the mold for blow molding by supplying pressurized air from a gas supply port provided separately from the liquid supply port into the preform after the liquid supply port is closed, wherein in the air blow molding step, the preform of the halfway shape is stretched by the pressurized air for the molding into the full shape conforming to the inner surface of the mold;
   wherein a headspace having a volume corresponding to a difference between a liquid volume supplied to the preform in the liquid blow molding step and a full capacity of the liquid container is generated in the liquid container after molding.

2. The liquid container manufacturing method according to claim 1, comprising:
   a rod stretching step of axially stretching the preform by a stretching rod before or during the liquid blow molding step; and
   a rod pulling step of separating the stretching rod from the liquid container after the air blow molding step.

3. The liquid container manufacturing method according to claim 1, wherein in the method, no suck back of the liquid supplied into the preform is performed.

4. The liquid container manufacturing method according to claim 1, comprising, after the air blow molding step, a release to atmosphere step of releasing an inside of the liquid container to atmosphere through the gas supply port.

5. The liquid container manufacturing method according to claim 4, comprising:
   a rod stretching step of axially stretching the preform by a stretching rod before or during the liquid blow molding step; and a rod pulling step of separating the stretching rod from the liquid container after the air blow molding step.

* * * * *